(12) United States Patent  
Jemaa et al.

(10) Patent No.: US 8,349,130 B2
(45) Date of Patent: Jan. 8, 2013

(54) PROCESS FOR TREATING PULP MILL CONDENSTATES USING A HOLLOW FIBER CONTACTOR

(75) Inventors: Naceur Jemaa, Pointe-Claire (CA); Michael Paleologou, Beaconsfield (CA); Brian O'Connor, Kirkland (CA)

(73) Assignee: FPInnovations, Pointe Claire, QC (CA)

( * ) Notice: Subject to any disclaimer, the term of this patent is extended or adjusted under 35 U.S.C. 154(b) by 346 days.

(21) Appl. No.: 12/452,735

(22) PCT Filed: Jul. 24, 2008

(86) PCT No.: PCT/CA2008/001373
§ 371 (c)(1),
(2), (4) Date: Jan. 20, 2010

(87) PCT Pub. No.: WO2009/012597
PCT Pub. Date: Jan. 29, 2009

(65) Prior Publication Data
US 2010/0122784 A1 May 20, 2010

Related U.S. Application Data

(60) Provisional application No. 60/935,105, filed on Jul. 26, 2007.

(51) Int. Cl.
*D21C 11/00* (2006.01)
(52) U.S. Cl. .......................................... 162/14
(58) Field of Classification Search .............. 162/14; 429/506, 411
See application file for complete search history.

(56) References Cited

U.S. PATENT DOCUMENTS

| | | | |
|---|---|---|---|
| 3,956,112 A | 5/1976 | Lee et al. | |
| 4,664,808 A | 5/1987 | Kim | |
| 4,770,852 A | 9/1988 | Takahara et al. | |
| 4,789,468 A * | 12/1988 | Sirkar ........................ | 210/137 |
| 4,952,751 A | 8/1990 | Blume et al. | |
| 4,960,520 A | 10/1990 | Semmens | |
| 4,995,888 A | 2/1991 | Beaupre et al. | |
| 5,232,593 A | 8/1993 | Pedersen et al. | |
| 5,294,307 A * | 3/1994 | Jackson ..................... | 205/349 |
| 5,637,224 A * | 6/1997 | Sirkar et al. .................. | 210/644 |
| 6,110,376 A | 8/2000 | Savage et al. | |
| 6,194,817 B1 | 2/2001 | Yachi et al. | |
| 6,306,357 B1 | 10/2001 | Simonson et al. | |

(Continued)

FOREIGN PATENT DOCUMENTS

CA 2286144 8/1999

(Continued)

*Primary Examiner* — Matthew Daniels
*Assistant Examiner* — Jacob Thomas Minskey
(74) *Attorney, Agent, or Firm* — Norton Rose Canada LLP

(57) ABSTRACT

A method and apparatus for the treatment of pulp mill condensates is described. A hollow fiber contactor, incorporating a hydrophobic membrane, was used to remove several undesirable compounds from pulp mill condensates. For example, TRS compounds and $SO_2$ were efficiently stripped from kraft and sulphite mill evaporator condensates, respectively. Methanol was also removed from kraft mill condensates but at a lower efficiency than TRS. Furthermore, other undesirable compounds found in condensates of pulp mills that contribute to the BOD and COD loading to effluent treatment systems were also removed. These contactors are cost effective since air, vacuum or a suitable solvent or scrubbing solution can be used as the stripping medium to drive off through the membrane several undesirable compounds from the feed solution. The undesirable compounds removed can thus be burned in the recovery boiler, lime kiln or a dedicated boiler.

11 Claims, 6 Drawing Sheets

| U.S. PATENT DOCUMENTS | | | | FOREIGN PATENT DOCUMENTS | | |
|---|---|---|---|---|---|---|
| 6,331,248 B1 | 12/2001 | Taniguchi et al. | | CA | 2298393 | 9/2000 |
| 6,790,313 B1 * | 9/2004 | Sandquist et al. | 162/15 | | | |
| 2004/0195189 A1 | 10/2004 | Kopinke et al. | | * cited by examiner | | |
| 2006/0016751 A1 | 1/2006 | Ali et al. | | | | |

PROCESS FOR TREATING PULP MILL CONDENSATES USING A HOLLOW FIBER CONTACTOR

CROSS-REFERENCE TO RELATED APPLICATIONS

This application is a National entry of PCT/CA2008/001373 filed Jul. 24, 2008, in which the United States of America was designated and elected, and which remains pending in the International phase until Jan. 26, 2010, which application in turn claims priority from US Provisional application Ser. No. 60/935,105 filed Jul. 26, 2007.

This application claims priority under 35 U.S.C. 119(e) from US Provisional application Ser. No. 60/935,105 filed July 26, 2007.

TECHNICAL FIELD

This invention relates to a method of treating an effluent stream from a pulp mill to produce a stream which can be recycled to the pulp mill.

BACKGROUND ART

A hollow fiber contactor is mainly composed of a bundle of hollow fibers inside a contactor shell with both free ends potted in epoxy resin. The hollow fibers can be made of several materials such as polypropylene, cellulose acetate, and polyamide. Methods for manufacturing these contactors are described elsewhere by suppliers such as Du Pont, Dow, Monsanto, Hercules, and Celanese. Some of the recent patents describing ways of manufacturing these contactors include U.S. Pat. No. 5,470,469 by E.I. Du Pont de Nemours and Company, U.S. Pat. No. 6,616,841 by Celgard Inc., U.S. Pat. No. 5,695,545 by Hoechst Celanese Corporation, and U.S. Pat. No. 5,695,702 by Millipore Corporation.

Evaporator condensates from pulp mills contain several hazardous and undesirable compounds which often prevent the mill from recycling these streams to the fibreline and/or chemical recovery. These streams are unique and different in terms of composition and diversity from any other aqueous solutions treated using hollow fiber contactors. In fact, in kraft foul condensate more than 60 different compounds have been detected. To help pulp mills further advance towards system closure, condensates must be treated before being used to displace fresh hot water in various pulp mill operations. The major total reduced sulphur (TRS) compounds found in evaporator condensates from kraft pulp mills are: hydrogen sulphide ($H_2S$), methyl mercaptan ($CH_3S$), dimethyl sulphide ($CH_3SCH_3$) and dimethyl disulphide ($CH_3SSCH_3$). Other chemical compounds, present in evaporator condensates that contribute to organic loading to the effluent treatment system of pulp and paper mills (usually reported as Biochemical Oxygen Demand (BOD) or Chemical Oxygen Demand (COD)) include: methanol, ethanol, acetone, methyl ethyl ketone, terpenes, phenolics, and resin acids. Sulphite mill condensates contain a significant amount of $SO_2$ as well as other undesirable organic compounds (e.g. furfural, acetone, acetic acid, diacetyl, furfural mercaptan and furfural methyl sulphide). Most of these undesirable compounds have an unpleasant or repulsive odour and exposure of mill workers to them could lead to several health-related problems. Therefore, the need exists to develop cost-effective approaches for removing these compounds from pulp mill condensates:

At present, most kraft pulp mills use air stripping to remove most of the TRS compounds or steam stripping to remove both TRS and methanol from evaporator condensates. Other kraft mills sewer their condensate which causes odour problems in the proximity of the mill and/or excessive hydraulic and organic loading to the effluent treatment system. Air stripping requires tall and expensive columns and may lead to operational problems such as foaming, flooding or channeling. Steam stripping is usually associated with high capital and operating costs since live steam is employed in most cases. In the case of steam stripping, the steam-to-condensate mass ratio needed for adequate TRS and methanol removal is between 15 to 20% on a mass basis. Other approaches such as the thermal oxidizer technology or chemical addition can be employed to destroy or mask the odour of the odorous compounds; however, these alternatives are associated with high capital and/or operating costs. On the average, the overall amount of condensate produced by a pulp mill can be about 8500 L/tonne of pulp produced. A typical North American mill produces about 1000 tonne of pulp per day. In most cases, only a fraction of the condensate is treated in a steam stripper for TRS and methanol removal.

U.S. Pat. No. 6,110,376 describes a method to treat evaporator clean condensate using a reverse osmosis (RO) membrane system. This technology is used in one kraft mill in North America. However, RO requires high pressures and large membrane areas to achieve the required high fluxes. U.S. Pat. No. 4,952,751 deals with the treatment of evaporator condensates using pervaporation. A silicone rubber membrane was used to remove methanol from black liquor evaporator condensate. No other odorous or TRS compounds were considered for removal from this stream. None of the aforementioned approaches included the use of hollow fiber membrane contactor technology for the treatment of pulp mill evaporator condensates.

Hollow fiber contactors can be used to treat pulp mill condensates efficiently and economically. These contactors contain several fibers into the interior of which an aqueous feed solution is allowed to flow while an acceptor fluid, or stripping agent, for example, another aqueous solution or a gaseous carrier, is allowed to flow on the outside of the fibers. These contactors can provide fast mass transfer without flooding or loading since the acceptor fluid and the aqueous feed solution flow on different sides of the hollow fiber and, hence, can be better controlled. Fast mass transfer in these hollow fiber modules is assured by the high surface membrane area per unit volume. It has been shown that the mass transfer of volatile compounds in hollow fiber contactors, in which air is used as the stripping medium, can be an order of magnitude greater than that achievable in packed towers. In summary, the use of these contactors has several advantages over air stripping:

Lower air flow rates when air is used as the stripping agent in the hollow fiber contactor.

The flow of the aqueous feed solution and the stripping agent (aqueous solution or gaseous carrier) can be controlled separately since a membrane separates the two.

No aqueous flow channeling.

DISCLOSURE OF THE INVENTION

It is an object of this invention to provide a method of treating a pulp mill effluent stream, to produce a stream which can be recycled to the pulp mill.

It is a particular object of this invention to provide a method of removing odorous and other undesirable compounds from an aqueous pulp mill evaporator condensate.

It is still a further object of this invention to provide an improvement in pulp manufacture, in which undesirable compounds are removed from an aqueous pulp mill evaporator or other condensate (e.g. digester condensate, stripper off gas condensate, foul condensate) to produce a recyclable aqueous stream, and said recyclable stream is recycled to the pulp mill.

In accordance with one aspect of the invention, there is provided a method for removing undesirable compounds from an aqueous pulp mill effluent stream comprising:

providing a hollow fibre membrane contractor comprising a plurality of hollow fibres, each fibre having a hydrophobic membrane wall having first and second opposed sides;

flowing the aqueous pulp mill effluent stream through said contactor, in contact with the first sides of the walls of the fibres; and allowing undesirable compounds in said flowing stream to migrate through the membrane walls to said second sides of the walls of the fibres.

In another aspect of the invention, there is provided a process of pulp manufacture in a pulp mill, in which an aqueous pulp mill effluent stream is formed, containing undesirable compounds, the improvement wherein the undesirable compounds are removed from effluent stream by the method of the invention, and the aqueous stream is recovered and recycled in the pulp mill as water supply in the pulp manufacture.

DETAILED DESCRIPTION OF DRAWINGS

Figure 1:
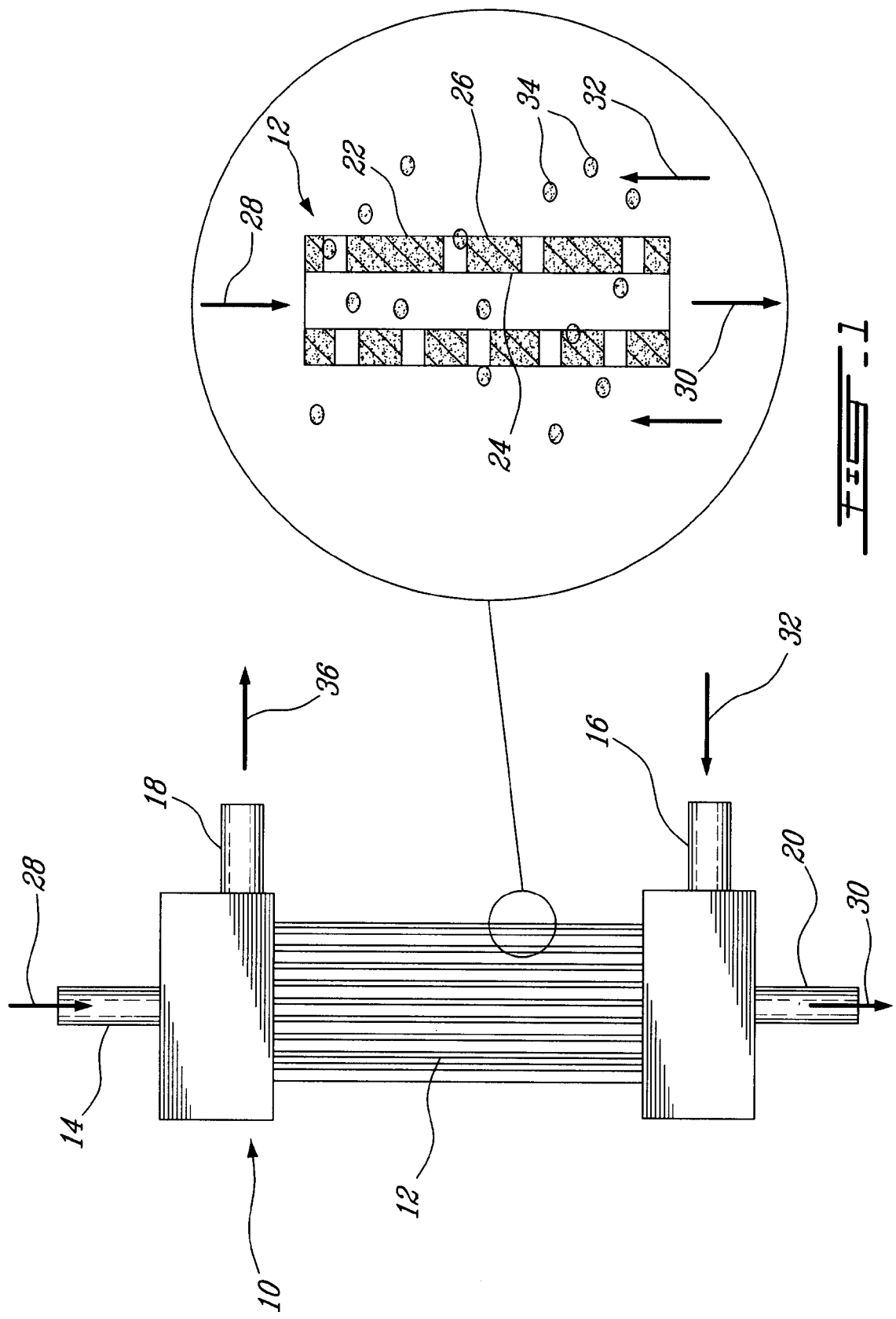
FIG. 1 illustrates schematically the operation of a contactor in the method of the invention employing an acceptor fluid.

With further reference to FIG. 1 a contactor 10 has a plurality of hollow fibres 12, an inlet port 14 for contaminated condensate or solution 28, an inlet port 16 for a stripping phase 32, for example air or an aqueous phase, an outlet port 18 for the contaminated stripping phase 36 and an outlet 20 for the decontaminated condensate 30.

The detail of a hollow fibre 12 having a fibre wall 22 with an interior side 24 and an outer side 26, illustrates the migration of contaminants 34 from condensate 28 through wall 22 from the interior side 24 to the outer side 26 into stripping phase 32, and the passage of the decontaminated condensate 30 from fibre 12.

Figure 2:
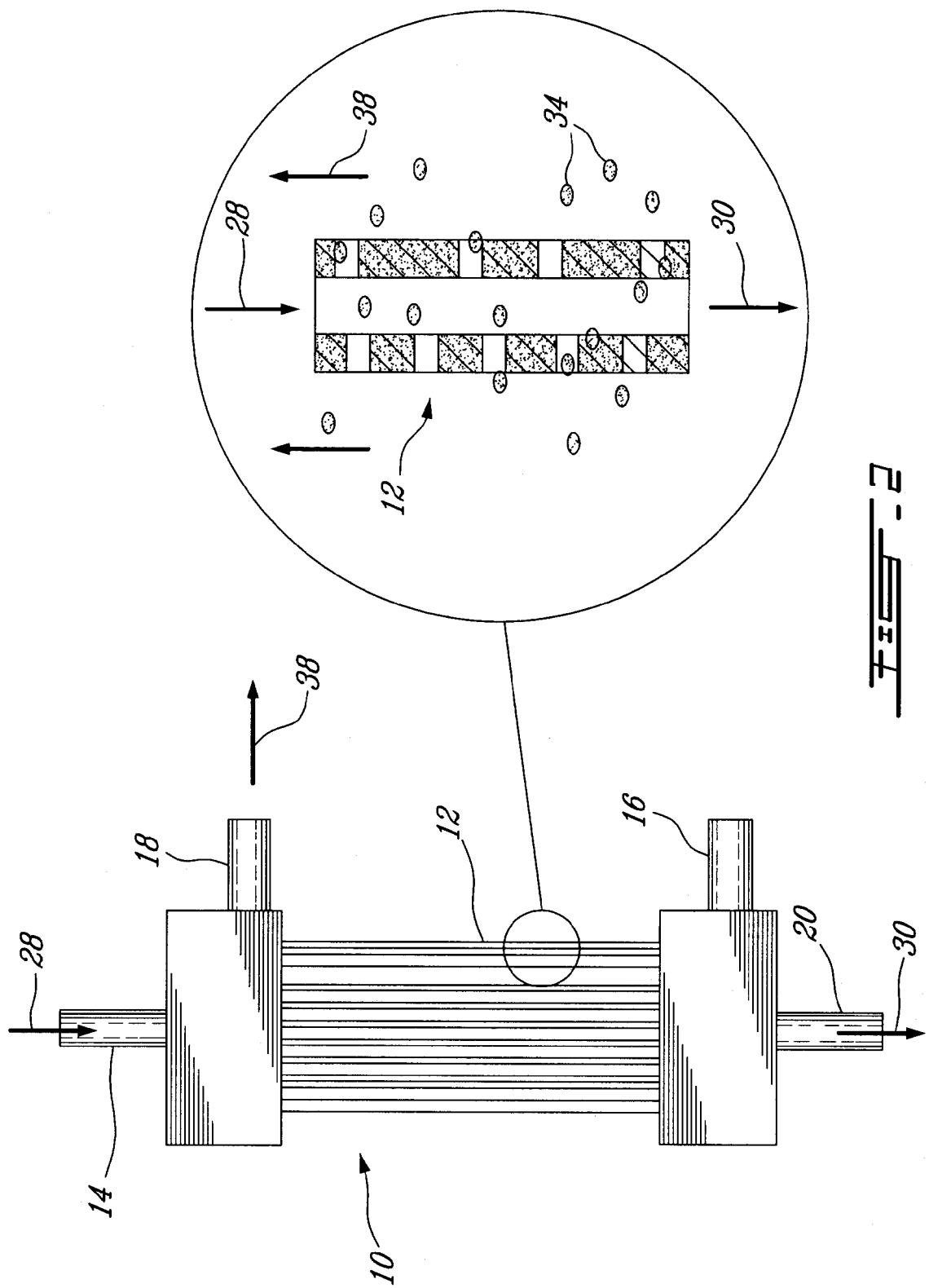
FIG. 2 is similar to FIG. 1 but illustrates the method of the invention employing a vacuum in place of the acceptor fluid.

FIG. 2 shows the contactor 10 of FIG. 1 but with a vacuum 38 replacing the stripping phase 32.

Figure 3:
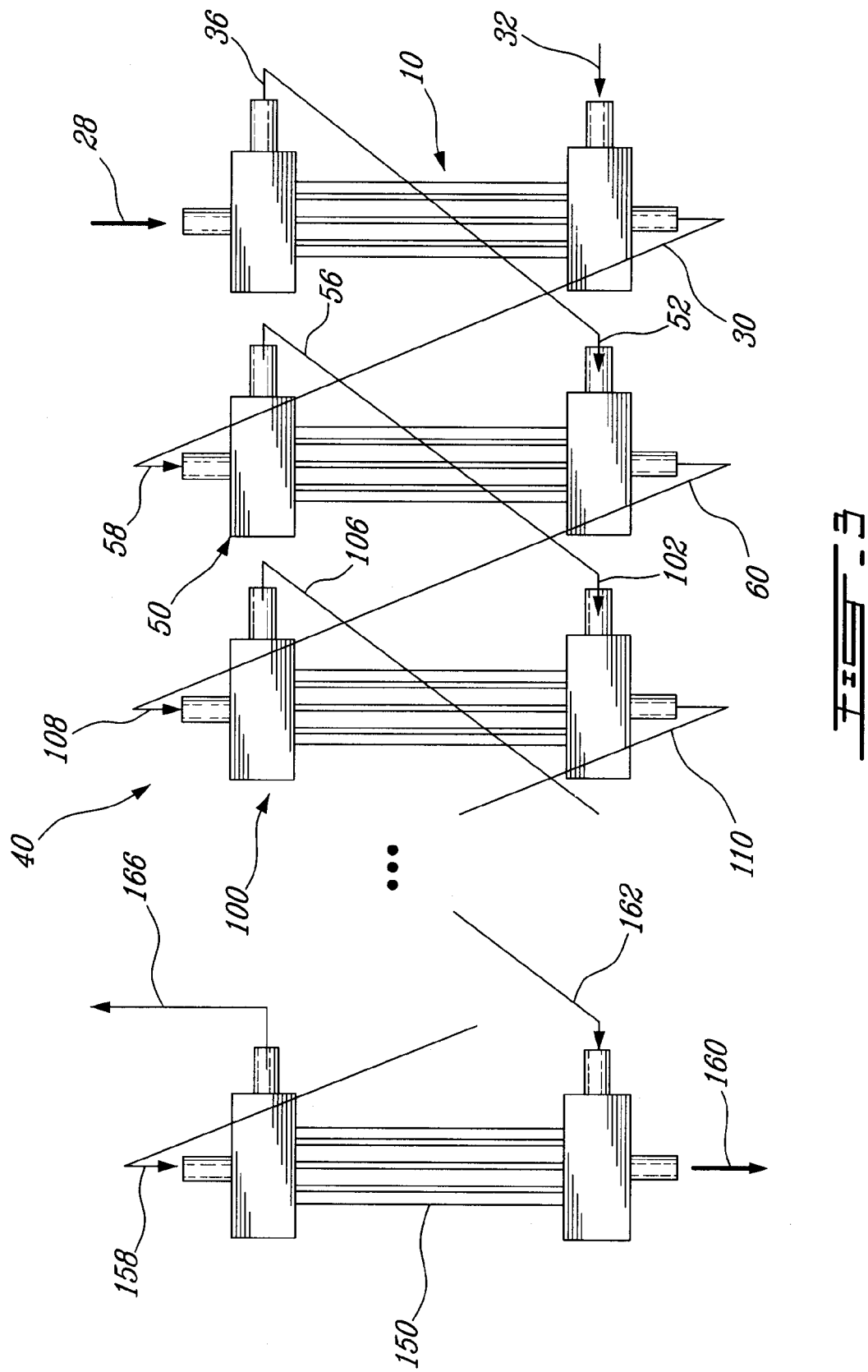
FIG. 3 illustrates schematically the method as in FIG. 1 but employing a plurality of contactors in series.

FIG. 3 shows an assembly 40 of identical contactors 10, 50, 100 and 150, such as illustrated in FIG. 1, in series. In the assembly the decontaminated condensate 30 of contactor 10 is the contaminated condensate 58 for contactor 50, and the contaminated stripping phase 36 from contactor 10 is the stripping phase 52 for contactor 50. This relationship continues through the series of contactors 10, 50, 100 and 150, whereby the stripping phases 32, 52, 102 and 162 become increasingly contaminated phases 36, 56, 106 and 166; and the contaminated condensates 28, 58, 108 and 158 become successively less contaminated as decontaminated condensates 30, 60, 110 and 160. In the case where the stripping phases 32, 52, 102 and 162 are based on air the final contaminated phase 166 may be fed to a burner (not shown) for destruction of contaminants; and the decontaminated condensate 160 is the cleanest phase which may be recycled in the pulp mill.

The stripping phase could also flow counter-currently to the contaminated condensate in assembly 40, while still being in counter-flow to the condensate in the individual contactors 10, 50, 100 and 150. Thus the stripping phase 32 might initially enter contactor 150 at the port from which stripping phase 162 is shown entering contactor 150 in FIG. 3, and would then follow a path through assembly 40 which is the reverse of that illustrated in FIG. 3, ie. would flow in the direction 162 to 166 to 102 to 106 to 52 to 56 to 32 to 36.

The stripping phase could also flow counter-currently to the contaminated condensate in assembly 40. Thus the stripping phase 32 might initially enter contactor 150 (at the port from which contaminated phase 166 is shown exiting in FIG. 3) and then pass successively through contactors 100, 50 and 10. In this way the cleanest stripping phase 32 would be employed to strip contaminants from a downstream contaminated phase (110 in FIG. 3) of the assembly 40.

Figure 4:
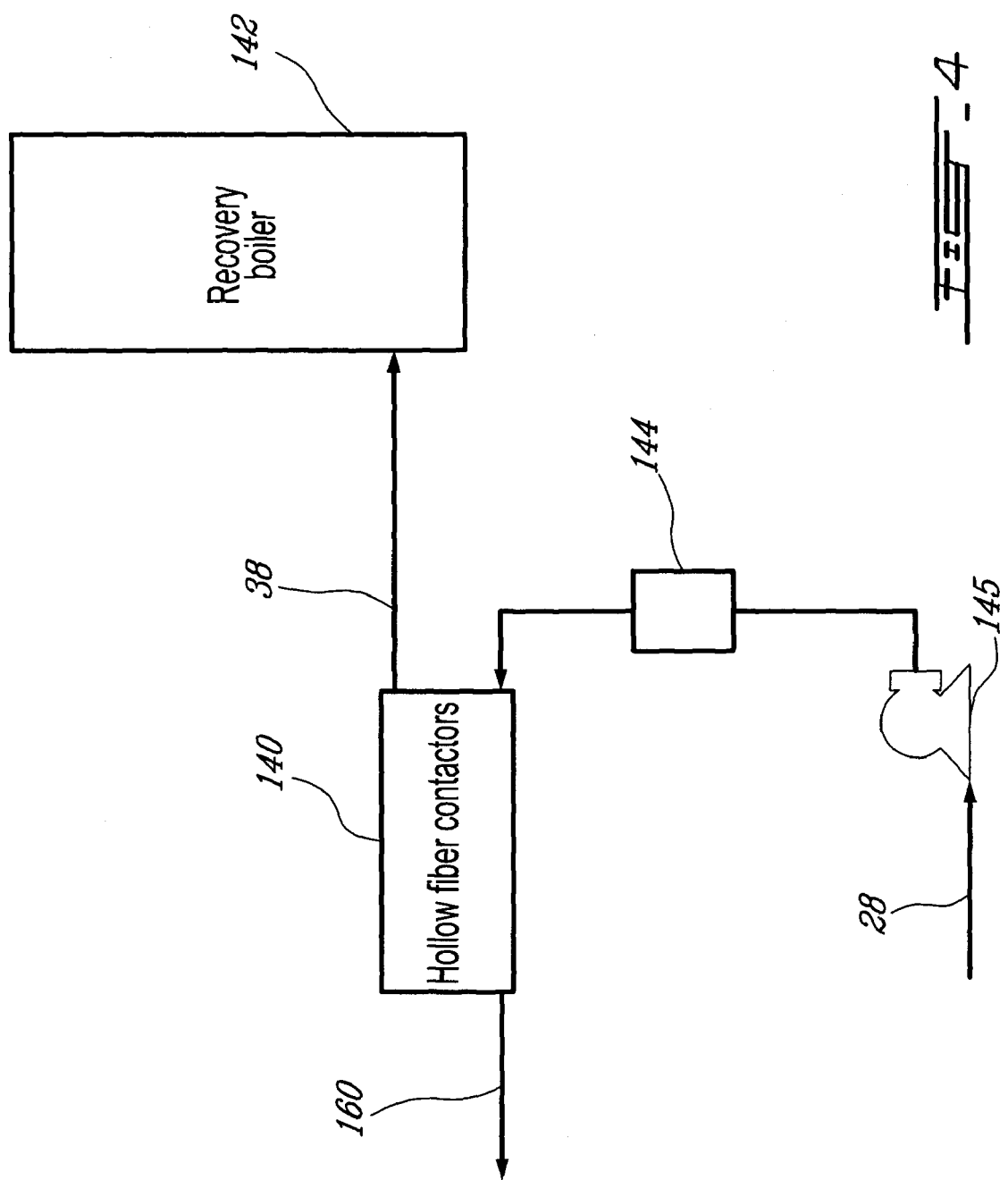
FIG. 4 illustrates schematically the method of FIG. 2 in which extracted undesirable compounds are fed to a recovery boiler.

FIG. 4 shows an assembly 140, similar to assembly 40 of FIG. 3 but employing vacuum 38 as in FIG. 2 for stripping contaminants. The stripped contaminants are fed to recovery boiler 142 for burning. The contaminated condensate is pumped by pump 145 through a strainer 144 to remove any residual solid particles, such as fibres, in the condensate, and is then fed to assembly 140.

Figure 5:
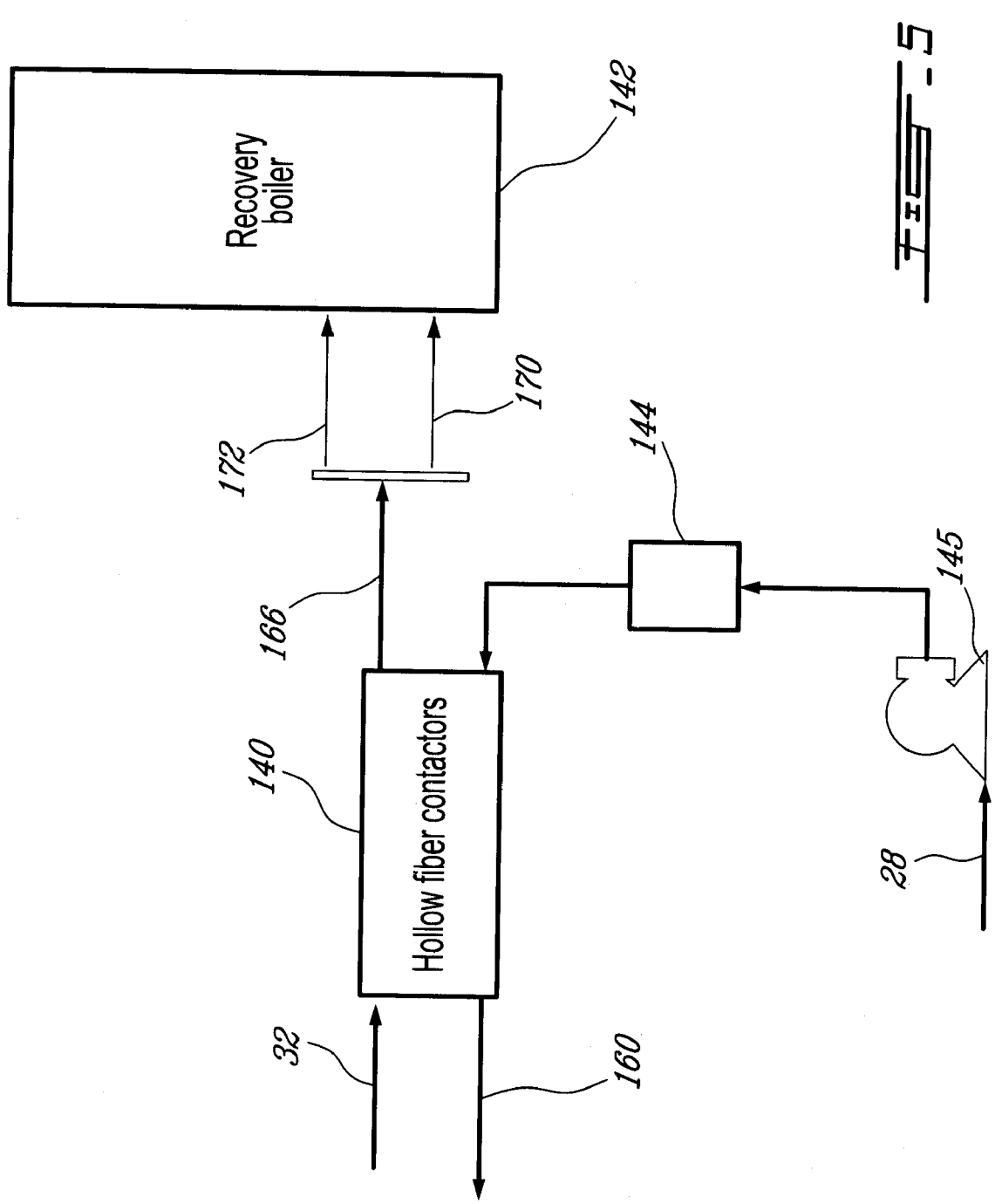
FIG. 5 is similar to FIG. 4 but applied to the method of FIG. 1 in which the acceptor fluid is air.

FIG. 5 is similar to FIG. 4 but employs air stripping, and the air loaded with contaminants is employed as primary air 170 and secondary air 172 for the recovery boiler.

Figure 6:
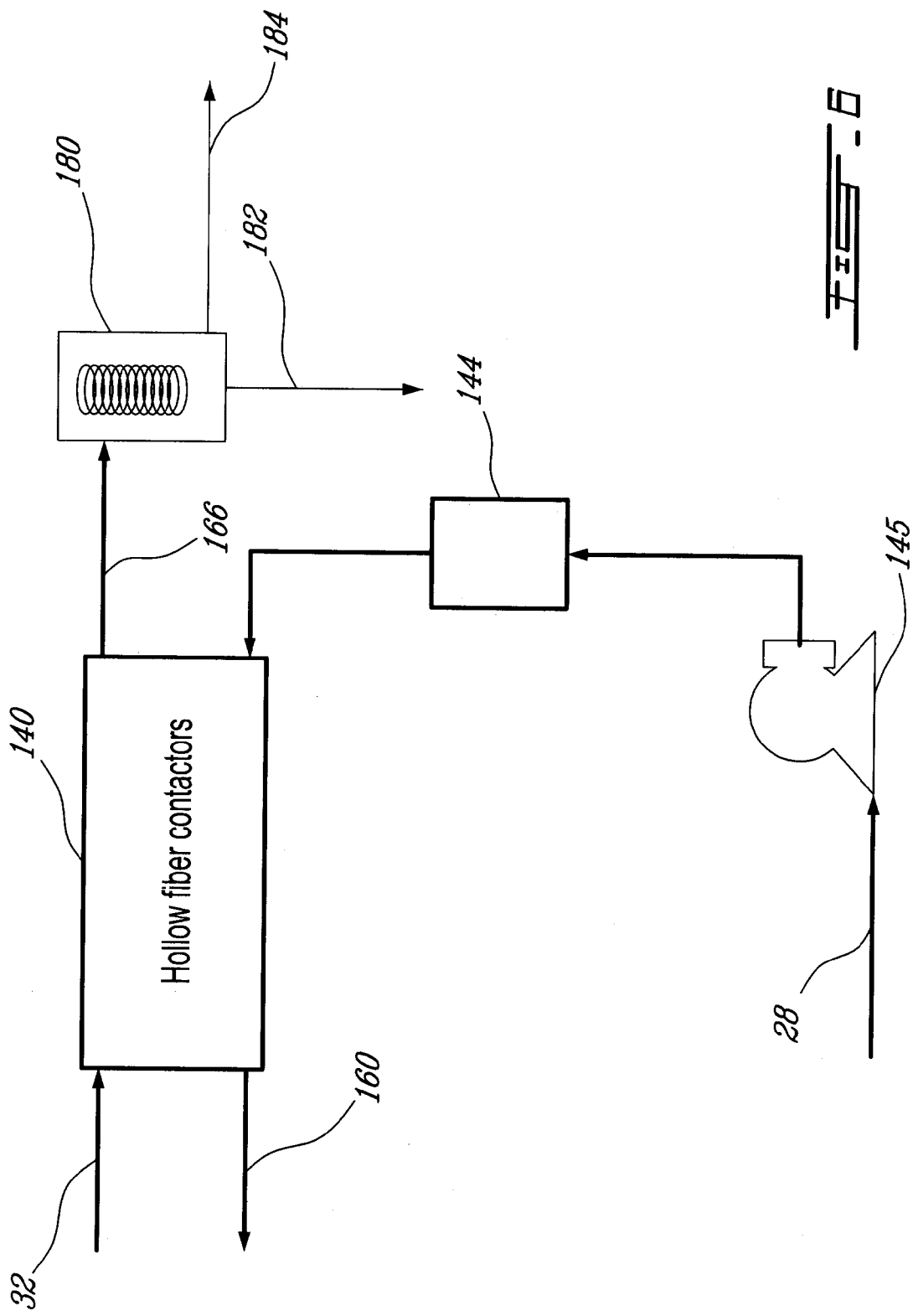
FIG. 6 illustrates schematically the method of the invention as in FIG. 1, but further including a recovery step for recovering methanol extracted by the acceptor fluid from a pulp mill evaporator condensate.

FIG. 6 is similar to FIG. 5 but for recovery of methanol, the contaminated phase 166 is fed to a condenser 180. Methanol 182 is recovered from condenser 180 and stripping air 184 loaded with other contaminants is fed to a recovery boiler (not shown) as in FIG. 5.

DESCRIPTION OF PREFERRED EMBODIMENTS

In one embodiment of the invention, the compounds which migrate through the hydrophobic membrane walls from the first side to the second side are extracted into the second side by a flowing acceptor fluid, for example, a stripping gas or a liquid carrier having a greater affinity for these compounds than the aqueous effluent stream. Suitable stripping gases include nitrogen, carbon dioxide and air. Suitable liquid carriers include alkaline solutions, which are especially suitable when the undesirable compounds are acidic, as for example: sulphur dioxide, hydrogen sulfide, and mercaptan. In this case, the alkaline components of the alkaline solution react with the acidic compounds of the feed solution in the proximity of the membrane to form the corresponding salts (plus water), thereby creating an additional driving force across the membrane.

In another embodiment, a vacuum is applied on the second side of the membrane walls of the hollow fibres and the volatile and other undesirable compounds migrate through the membrane wall into the vacuum.

The aqueous effluent is, in particular, an evaporation condensate from the pulp mill in which undesirable compounds are retained in the evaporated and condensed water. On removal of the undesirable compounds, in accordance with the method of the invention, the resulting stripped aqueous effluent is recycled to meet part of the water requirement of the pulp mill.

The removal and/or recovery of even a small portion of the undesirable compounds in pulp mill condensates, using hollow fiber contactors has never been investigated. Surprisingly, it has now been found that hollow fiber contactors can be used to remove simultaneously several of these undesirable and/or odorous compounds from condensates both efficiently and effectively, even at high feed concentrations. In fact, in many cases, removal rates over 95% have been achieved, thus providing an aqueous stream of sufficient purity to enable its recycle to the mill thereby reducing both fresh water and energy requirements. In other cases, high recovery of some compounds such as $SO_2$ and acetic acid was shown to be possible and achievable using the appropriate stripping medium. If these chemicals are returned to the mill chemical recovery cycle, the cost of make up chemicals will be reduced, more steam and electricity will be produced and the effluent treatment system will be offloaded with respect to BOD and COD.

Since the aqueous effluent is typically at an elevated temperature, and since the method of the invention can be carried out without significant heat loss, a recycle stream can be produced having its own heat energy, thus reducing energy requirements at the pulp mill, as compared to relying solely on fresh water which requires heating.

In especially preferred embodiments, the effluent flows through the hollow fibres in contact with the inside face of the wall of these fibres, which forms the first side; and the acceptor fluid flows in contact with, or the vacuum is applied at the outside face of the wall of the fibres, which thus forms the second side.

In another embodiment, the aqueous effluent stream and said acceptor fluid flow through a plurality of contactors in series, whereby the effluent stream is depleted in undesirable compounds at each successive contactor and the acceptor fluid is enriched in undesirable compounds at each successive contactor.

By way of example, in the case of a typical contactor having a length of 11 inches and a diameter of 0.5 inches, the aqueous pulp mill effluent stream suitably, flows through the contactor at 100 to 2500, preferably 150 to 350 mL/min and the acceptor fluid flows through the contactor at 1 to 5, preferably 3 to 4 L/min at normal pressure; and the effluent stream flows in a direction which is countercurrent to the acceptor fluid flow. Flow rates will vary depending on the contactor size.

This invention thus provides a new method for treating condensates from pulp and paper mills thereby allowing the re-use of these streams within the mill. Evaporator foul, contaminated, combined and clean condensates as well as digester condensates from kraft pulp mills contain TRS compounds and can be efficiently and economically treated using hollow fiber contactors. The treated condensate will be cleaner, containing less BOD, COD, and TRS compounds. The treated condensate can thus be used in place of fresh hot water in the pulp machine, the bleach plant and other mill operations. In fact, since treated condensate does not contain any multivalent metal ions it might be preferable to use this stream, in place of mill hot water, in such mill operations as peroxide bleaching and lime mud washing to avoid problems with peroxide decomposition and lime availability, respectively.

The contaminated condensate can be pumped and passed through (or outside) the hollow fibers while the acceptor fluid, such as a sweep or stripping gas (e.g. air), is passed on the outside surface of the fibers (or inside the fibers). The chosen flow rate of the gas to be used will depend on the Henry's constant of the undesirable compound(s). The lower the Henry's constant, the higher the air to condensate flow rate ratio needed to achieve high removal efficiencies. Increasing the condensate feed temperature will help increase the Henry's constant and reduce the aforementioned ratio. The contactor was operated at the highest permissible temperature (60-65° C.). Alternatively, a vacuum can be applied in the outside compartment of the membrane hollow fibers to extract the contaminants from the condensate as indicated in FIG. 2. The magnitude of the applied vacuum will depend on the volatility of undesirable compounds to be removed (less than 0.5 atm).

The use of hydrophobic hollow fiber membranes allows several of the undesirable compounds present in the condensate to go through the membrane pores. In contrast, since the membrane is hydrophobic, water molecules as well as other hydrophilic compounds do not go through the membrane. Therefore, the amount of water carried by the vacuum or the sweep gas is very limited.

A set of hollow fiber contactors can be used to achieve the degree of separation required during once-through operation. The number of contactors used will be a function of the nature and level of contaminants in the condensate, the flow of the condensate and the desired degree of removal. One configuration using air as a carrier is shown in FIG. 3. This configuration shows the once-through mode of operation. Depending on the application, the availability of tanks and other factors, the system can be operated in a batch or feed-and-bleed mode.

To minimize capital costs, pulp mills have the option of using an existing vacuum system at the mill site (e.g. NCG collection system) to pull out TRS and other undesirable compounds from mill condensates and burn them in a boiler, as shown in FIG. 4. Alternatively, air, used as primary air or secondary air in the boiler, can be sent through the contactors to strip these compounds and burn them in the boiler, as shown in FIG. 5.

Alternatively, aqueous alkaline solutions (e.g. sodium hydroxide) can be used instead of air as the acceptor fluid. In this case, the flux of acidic compounds such as $H_2S$, $CH_3SH$, acetic acid, and $SO_2$ into the stripping compartment will be enhanced due to their reaction with sodium hydroxide to form the corresponding salts. For ammonia, magnesium, calcium, and sodium base sulphite pulp mills, bases such as ammonium hydroxide, magnesium hydroxide, calcium hydroxide, and sodium carbonate, respectively, can be used to strip and recover $SO_2$ from the condensate. The resulting $NH_4HSO_3$, $Mg(HSO_3)_2$ $Ca(HSO_3)_2$, and $NaHSO_3$ streams can be used in the preparation of the cooking liquor. Similarly, kraft mills can recover sulfur-containing compounds from the condensate by using an alkaline stream (e.g., green liquor, white liquor, weak black liquor, alkaline bleaching filtrate, and weak wash).

The methanol stripped from condensate solutions after treatment using a hollow fiber contactor with air as the stripping gas can be recovered by cooling the carrier gas as indicated in FIG. 6. Methanol could then be used within the mill as a fuel, as a feedstock to the chlorine dioxide generator, or as a sulphur-free feedstock to a fuel cell for the production of electrical energy.

In the case of kraft pulp mills, which already have a steam stripper, the opportunity exists to condense the methanol in the stripper off-gases. The condensed methanol solution can then be purified using the hollow fiber contactor approach of the invention, to remove any TRS or other undesirable compounds that might be present. The purified methanol can thus be employed in the chlorine dioxide generator or purified and/or concentrated further for use in other applications.

Experiments have demonstrated the technical feasibility of removing more than 99% of TRS compounds from a kraft mill condensate solution using a hollow fiber contactor. In the case of sulphite mill condensates, experiments demonstrated the technical feasibility of removing over 90% of the $SO_2$ content when air was the stripping gas and over 97% of the $SO_2$ when a dilute alkaline solution was used as the acceptor fluid. The latter approach provides the opportunity to concentrate the $SO_2$ in the form of $NaHSO_3/Na_2SO_3$ in the alkaline stream for further use at the mill site (e.g. scrubbing medium for bleach plant gaseous emissions).

EXAMPLES

Example 1

TRS and Methanol Removal from Kraft Pulp Mill Digester Condensate

The hollow fiber contactor used in this work was about half an inch in diameter and about 11 inches long. It contained about 3600 fibers made out of polypropylene. Each fiber had an outside and an inside diameter of 300 and 220 microns, respectively. The effective surface area based on the outside diameter was about 0.7 m². The contactor is available commercially through several suppliers such as Celgard Inc. (Charlotte, N.C.). These fibers are hydrophobic and hence, only hydrophobic compounds diffuse into the hollow fiber membrane pores, and water molecules as well as other hydrophilic compounds are mostly excluded.

A hollow fiber contactor, as described above, was used to remove TRS compounds and methanol from a kraft pulp mill digester condensate. The pH of the solution was lowered to about 6.0 by the addition of sulfuric acid. The condensate was heated to 60° C. and pumped through the membrane contactor. Nitrogen was used on the outer side of the hollow fibers as indicated in FIG. 1 to remove the contaminants. Table 1 shows the results obtained when kraft mill condensate was recirculated through the hollow fiber contactor. The condensate was flowing at a flow rate of about 200 ml/min while nitrogen was flowing at about 3.5 L/min. Some of the TRS compounds were lost during the heating process following pH adjustment. Time 0 minutes corresponds to the start of the experiment. The condensate was placed in a 1.8-L container and was recirculated into and out of the hollow fiber contactor (batch mode of operation). Two sodium hydroxide traps were used to capture some of the TRS compounds being stripped from the evaporator condensate being treated. After only 15 minutes from start up, more than 97% of the hydrogen sulphide and more than 95% of the methyl mercaptan were removed. After 30 min of operation, the levels of hydrogen sulphide and methyl mercaptan in the recirculating condensate solution began to level off. After two hours of treatment, the following removal efficiencies were obtained: 98.6%, 98.9%, 99.9%, and 97.2% for hydrogen sulphide ($H_2S$), methyl mercaptan ($CH_3SH$), dimethyl sulphide ($CH_3SCH_3$) and dimethyl disulphide ($CH_3SSCH_3$), respectively. Methanol was reduced by about 19% under the above experimental conditions. These results suggest that by having a hollow fiber contactor ahead of a steam stripper a mill will be in a position of producing relatively pure methanol to be used for other purposes. This can be accomplished by condensing the off-gas from the stripper which, in this case, will contain relatively low levels of TRS compounds.

TABLE I

Treatment of digester condensate from a kraft pulp mill

| | | hydrogen sulfide (mg/L) | methyl mercaptan (mg/L) | dimethyl sulfide (mg/L) | dimethyl disulfide (mg/L) | Methanol (mg/L) |
|---|---|---|---|---|---|---|
| As received pH 9.62 | | 33.2 | 21.5 | 195.9 | 134.6 | |
| | Expt. time (min) | | | | | |
| (pH adjusted to 6) | 0 | 12.54 | 17.71 | 171.52 | 43.34 | 3497 |
| | 15 | 0.3 | 0.8 | 45.4 | 16.2 | |
| | 30 | 0.2 | 0.4 | 13.6 | 7.9 | |
| | 45 | 0.2 | 0.2 | 5.3 | 5.3 | |
| | 75 | 0.2 | 0.2 | 0.5 | 1.9 | |
| | 105 | 0.2 | 0.2 | 0.3 | 1.2 | |
| | 120 | 0.17 | 0.24 | 0.15 | 1.16 | 2844 |

Example II

Treatment of Methanol-Rich Stripper-Off Gas Condensate

As mentioned earlier, cooling the stripper-off gases will yield a solution rich in methanol but contaminated with TRS compounds. Removing these TRS compounds would enable the use of the concentrated methanol in the chlorine dioxide generator in place of purchased methanol. A sample of this methanol-rich solution was obtained from a hardwood (HW) kraft mill. The methanol content was about 70%. The solution, having a neutral pH, was passed through the membrane contactor at about 40° C. The solution and air flow rates were similar to Example I. Initial TRS composition and experimental results are presented in Table IIA. After about 3.0 hours of treatment, the removal efficiencies for hydrogen sulphide, methyl mercaptan, dimethyl sulphide, and dimethyl disulphide were 99.4%, 98.3%, 99.9%, and 97, respectively.

These removal efficiencies were high despite the large initial concentrations. These removal efficiencies were higher than 90% even after only 1.5 hours of operation. After 90 and 180 minutes the methanol losses were about 12% and 26%, respectively. When recycled to the chlorine dioxide generator, the treated methanol solution should not have any negative impact on chlorine dioxide generator operation. In fact, any residual TRS compounds will be destroyed by $ClO_2$. The contaminated air stream can be burned in the lime kiln, a boiler or a dedicated incinerator.

TABLE IIA

Treatment of methanol-rich solution contaminated with TRS compounds (hardwood pulp mill)

| Time (min) | hydrogen sulfide (mg/L) | Methyl mercaptan (mg/L) | dimethyl sulfide (mg/L) | dimethyl disulfide (mg/L) | Methanol (g/L) |
|---|---|---|---|---|---|
| 0 | 6073 | 1590 | 2740.6 | 1207.7 | 744.5 |
| 20 | 755.7 | 407.3 | 741.4 | 329.4 | N.D. |
| 40 | 273.9 | 228.7 | 285.9 | 210.9 | 720.8 |
| 90 | 66.7 | 68.8 | 26.7 | 117.9 | 657.2 |
| 180 | 35.9 | 26.4 | 4 | 36.4 | 551.2 |

N.D. not determined

A second sample of stripper-off condensate was obtained from a softwood (SW) kraft mill. The sample was processed through a 2.5×8 extra-flow membrane contactor (from Membrana (formerly Celgard), Charlotte, N.C.). This contactor has a porosity of 40% and a surface area of about 1.4 m². The contactor is about 2.6 inches in diameter and about 11.1 inches long. It has fibers having an outside diameter and an inside diameter of 300 and 220 microns, respectively. The stripper-off condensate was heated to about 55° C. and passed on the shell side of the contactor at a flow rate of 1-3.5 L/min. Nitrogen was used to strip the TRS compounds at a flowrate of 2-5 L/min. Other combinations of flowrates are possible. The condensate was processed as received and had a pH of about 8.65. The initial condensate volume in the feed reservoir was 1.1L. Results of this example are presented in Table IIB. The TRS removal efficiency for hydrogen sulphide, methyl mercaptan, dimethyl sulphide, and dimethyl disulphide were 90%, 100%, 100%, and 94, respectively. About half of the methanol was lost with the TRS compounds. The pH in this example was higher than the previous case which may affect the removal efficiency for hydrogen sulphide and the recovery of methanol.

TABLE IIB

Treatment of methanol-rich solution contaminated with TRS compounds (softwood pulp mill)

| Time (min) | hydrogen sulfide (mg/L) | Methyl mercaptan (mg/L) | dimethyl sulfide (mg/L) | dimethyl disulfide (mg/L) | Methanol (g/L) |
|---|---|---|---|---|---|
| 0 | 8609 | 1897 | 1527 | 60 | 115 |
| 20 | 4116 | 133 | 1119 | N.D. | 98 |
| 40 | 2710 | 44 | 972 | 55 | 89 |
| 120 | 1490 | 11 | 0 | 32 | 69 |
| 180 | 928 | 0 | 0 | 15 | ND |
| 240 | 997 | 0 | 0 | 4 | 59 |

N.D. not determined

Example III

Treatment of Evaporator Condensate from a Sulphite Mill

Weak acid evaporator condensate from a sulphite mill (pH=2.2) was passed through the contactor described above. The condensate was passed through the hollow fiber contactor at a flow rate of about 300 mL/min while nitrogen flowed countercurrently at a flow rate of 4 L/min. The condensate was heated to 60° C. prior to recirculation through the hollow fiber contactor. The objective of this experiment was to remove $SO_2$ and other odorous compounds. Table III shows the results of this trial. Sulfur dioxide (expressed as $SO_3^{2-}$) was reduced from 452 ppm to 72 ppm after 4 hours of operation. Other compounds of interest in this experiment were diacetyl, furfural, furfuryl mercaptan, and furfuryl methyl sulphide.

A second experiment was conducted after increasing the pH of the acid condensate in order to keep the $SO_2$ in solution (in its salt form) thereby improving the removal of other compounds. The experiment was performed under similar conditions as the one described above. Table IV summarizes the results. BOD, COD, TOC and methanol are indicated as well. After 4 hours of treatment, the diacetyl level did not change. Furfuryl mercaptan and furfuryl methyl sulphide, initially present at low concentrations, were completely removed. Furfural was reduced from 107.2 to 86.5 ppm. As expected, only a fraction of $SO_2$ was stripped (17.5%). BOD and COD removal rates were about 25% and 20%, respectively.

TABLE III

Treatment of evaporator condensate from a sulphite mill

| Time (min) | Diacetyl (ppm) | Furfuryl Mercaptan (ppm) | Furfuryl Methyl Sulphide (ppm) | Furfural (ppm) | $SO_3^{2-}$ (ppm) | BOD (ppm) | COD (ppm) | TOC (ppm) | Methanol (ppm) |
|---|---|---|---|---|---|---|---|---|---|
| 0 | 31.2 | 0.1 | 0.1 | 116.8 | 452 | 881 | 1358 | 392 | <0.1 |
| 15 | | | | | 331 | | | | |
| 30 | 31.1 | 0.1 | 0.1 | 116.1 | 270 | | | | |
| 60 | 30.3 | 0.1 | 0.1 | 108.8 | 194 | | | | |
| 90 | | | | | 146 | 774 | 1135 | 329 | <0.1 |
| 120 | | | | | 118 | | | | |
| 150 | 24.5 | 0.1 | 0.1 | 93.2 | 101 | | | | |
| 180 | | | | | 89 | | | | |
| 210 | 20.5 | 0.1 | 0.1 | 83.4 | 75.9 | | | | |
| 240 | 19.6 | 0.0 | 0.0 | 85.0 | 72 | 671 | 928 | 310 | <0.1 |

TABLE III-continued

Treatment of evaporator condensate from a sulphite mill

| Time (min) | Diacetyl (ppm) | Furfuryl Mercaptan (ppm) | Furfuryl Methyl Sulphide (ppm) | Furfural (ppm) | $SO_3^{2-}$ (ppm) | BOD (ppm) | COD (ppm) | TOC (ppm) | Methanol (ppm) |
|---|---|---|---|---|---|---|---|---|---|

TABLE IV

Treatment of evaporator condensate from a sulphite mill after increasing the feed solution pH

| Time (min) | Diacetyl (ppm) | Furfuryl Mercaptan (ppm) | Furfuryl Methyl Sulphide (ppm) | Furfural (ppm) | $SO_3^{2-}$ (ppm) | BOD (ppm) | COD (ppm) | TOC (ppm) | Methanol (ppm) |
|---|---|---|---|---|---|---|---|---|---|
| 0 | 26.3 | 1.5 | 1.5 | 107.2 | 489 | 996 | 1351 | 349 | <0.1 |
| 15 | 28.7 | 0.5 | 1.1 | 118.2 | 486 | | | | |
| 30 | 21.1 | 0.3 | 0.6 | 107.5 | 481 | | | | |
| 60 | 30.9 | 0.0 | 0.5 | 113.6 | 467 | | | | |
| 90 | 23.9 | 0.0 | 0.3 | 109.0 | 462 | 865 | 1233 | 388 | <0.1 |
| 120 | 31.4 | 0.0 | 0.2 | 106.0 | 453 | | | | |
| 180 | 24.0 | 0.0 | 0.1 | 88.8 | 430 | | | | |
| 210 | 24.4 | 0.0 | 0.1 | 98.8 | 410 | | | | |
| 240 | 26.3 | 0.0 | 0.0 | 86.5 | 403 | 745 | 1084 | 288 | <0.1 |

Example IV

Treatment of Evaporator Condensate from a Sulphite Mill using an Alkaline Stripping Solution The hollow fiber contactor was used to treat condensate from a sulphite mill as described above. In this case, a 0.05 M NaOH solution was employed instead of nitrogen to remove the $SO_2$ and other contaminants. A 2.0 L volume of this solution was re-circulated through the system. The feed solution and nitrogen flow rates were similar to those mentioned in Example III. Results are presented in Table V. About 98% removal for $SO_2$ was achieved compared to 84% in Table II (after 4 hours using air). The BOD, COD and TOC reductions were 63%, 57%, and 54%, respectively. Higher NaOH concentrations would allow the concentration of $SO_2$ produced in the form of $NaHSO_3/Na2SO_3$ to be significantly higher, if so desired. The $NaHSO_3/Na_2SO_3$ solution could potentially be used within the mill or sold.

Table VI shows the treatment of evaporator condensate from another sulphite mill using the same contactor described above. The feed was passed at a flow of 300 mL/min while 0.1 N sodium hydroxide was passed on the shell side at a flow rate of 220 mL/min The experiment was conducted at 65° C. The major constituents of this condensate are listed in Table V. After 4 hours of treatment, methanol, sulfite, BOD, COD, TOC, and acetic acid were reduced by 76.4%, 86.1%, 59.8%, 60.2%, 57.6%, and 66.5%, respectively.

TABLE V $SO_2$ removal using an alkaline stripping solution

| Time (min) | $SO_3^{2-}$ (ppm) | BOD (ppm) | COD (ppm) | TOC (ppm) | Methanol (ppm) |
|---|---|---|---|---|---|
| 0 | 472 | 891 | 1350 | 377 | <0.1 |
| 15 | 227 | | | | |
| 30 | | 656 | 1060 | 301 | <0.1 |
| 60 | 36.5 | | | | |
| 90 | | 425 | 760 | 214 | <0.1 |
| 120 | 18.2 | | | | |
| 150 | 14.4 | | | | |
| 180 | 12.1 | 333 | 580 | 175 | <0.1 |

TABLE VI $SO_2$ removal using an alkaline stripping solution

| Time (min) | $SO_3^{2-}$ (ppm) | BOD (ppm) | COD (ppm) | TOC (ppm) | Methanol (ppm) | Acetate (ppm) |
|---|---|---|---|---|---|---|
| 0 | 249 | 8027 | 11625 | 3664 | 1075 | 5853 |
| 15 | 129 | 7040 | 10163 | 3194 | 601 | 5409 |
| 30 | 91.4 | 6507 | 8913 | 2947 | 472 | 5055 |
| 60 | 68.1 | 5627 | 7800 | 2660 | 302 | 4716 |
| 120 | 47.7 | 4267 | 6700 | 2086 | 259 | 3434 |
| 180 | 40 | 3707 | 5000 | 1755 | 238 | 2673 |
| 240 | 34.6 | 3227 | 4625 | 1554 | 254 | 1960 |

Table VII presents the stripping of a condensate from a magnesia base sulphite mill at 60° C. and under the same flow conditions listed above. Magnesium hydroxide has a low solubility in water. Initially the feed solution was adjusted to have a concentration of $Mg(OH)_2$ of 215 ppm and this was added periodically to maintain the stripping solution alkaline thereby enhancing the transfer of acidic compounds. By the end of the trial about 64, 66, 67, and 73% of the BOD, COD, TOC, and methanol, respectively, were removed from the condensate. The final stripping solution can be taken back to the mill chemical recovery cycle thereby offloading the effluent treatment system in terms of BOD and COD.

TABLE VII

SO₂ removal using an alkaline stripping
solution of magnesium hydroxide

| Time (min) | $SO_3^{2-}$ (ppm) | BOD (ppm) | COD (ppm) | TOC (ppm) | Methanol (ppm) | Acetate (ppm) |
|---|---|---|---|---|---|---|
| 0 | 242 | 7467 | 10250 | 3740 | 802 | 5643 |
| 20 | 207 | 5853 | 8125 | 2980 | 417 | 4668 |
| 40 | 76 | 5027 | 6788 | 2630 | 284 | 4302 |
| 60 | 62 | 4700 | 6488 | 2330 | 228 | 3693 |
| 120 | 46 | 3630 | 5500 | 1940 | 214 | 2749 |
| 180 | 38 | 2970 | 3713 | 1640 | 199 | 2230 |
| 240 | 34 | 2600 | 3238 | 1450 | 215 | 1750 |

Example V

Treatment of Evaporator Condensate from a Sulphite Mill Using a Combination of Vacuum and Air A sample of an evaporator condensate was treated using the 2.5×8 extra-flow membrane contactor described in example II. The condensate was treated at 65° C. and was flowing on the shell side of the contactor at about 1 to 3.5 L/min. The initial volume of the condensate in the feed reservoir was 1.56L. A combination of air and vacuum used in the lumen side. The air flow rate varied from 0.4 to 3.5 L/min. Vacuum varied from 8 to 22 inches of mercury. Results of this trial are shown in Table VIII. The SO₂ removal efficiency in this case was about 75%. The BOD and COD removal efficiency was about 33 and 7%, respectively. Air and vacuum can be used to remove most of the SO₂ and retain the other components in solution.

TABLE VIII

SO₂ removal using a combination of air and vacuum

| Time (min) | $SO_3^{2-}$ (ppm) | BOD (ppm) | COD (ppm) |
|---|---|---|---|
| 0 | 481 | 5060 | 12300 |
| 20 | 373 | N.D. | N.D. |
| 40 | 313 | N.D. | N.D. |
| 60 | 283 | 4550 | N.D. |
| 120 | 184 | 4220 | N.D. |
| 180 | 126 | 4030 | 11400 |
| 240 | 119 | 3350 | 11500 |

The invention claimed is:

1. A method for removing off gas contaminants from an aqueous evaporation condensate pulp mill effluent stream, which aqueous evaporation condensate contains methanol and off gas contaminants selected from the group consisting of sulphur dioxide and total reduced sulphur (TRS) compounds comprising:
   providing a hollow fibre membrane contactor comprising a plurality of hollow fibres, each fibre having a hydrophobic membrane wall having first and second opposed sides;
   flowing the aqueous evaporation condensate through said contactor, in contact with the first sides of the walls of the fibres; and
   flowing an acceptor fluid through the contactor, in contact with the second sides of the walls of the fibres, allowing said off gas contaminants in said aqueous evaporation condensate to migrate through the membrane walls to said second sides of the walls of the fibres and extracting the undesirable compounds migrating through the membrane walls with said acceptor fluid, while leaving an aqueous methanol stream rich in the methanol of said condensate at said first sides of said walls; said acceptor fluid being selected from a stripping gas or an aqueous alkaline solution.

2. A method according to claim 1, wherein said acceptor fluid is a stripping gas.

3. A method according to claim 2, wherein said gas is nitrogen, carbon dioxide or air.

4. A method according to claim 1, wherein said acceptor fluid is an aqueous alkaline solution.

5. A method according to claim 1, wherein said aqueous evaporation condensate and said acceptor fluid flow through a plurality of contactors in series, whereby said aqueous evaporation condensate is depleted in said off gas contaminants at each successive contactor and said acceptor fluid is enriched in off gas contaminants at each successive contactor.

6. A method according to claim 1, wherein said off gas contaminants are total reduced sulphur (TRS) compounds selected from the group consisting of hydrogen sulphide, methyl mercaptan, methyl disulphide and dimethyl disulphide.

7. A method according to claim 1, wherein said aqueous evaporation condensate is steam stripper off gas condensate.

8. In a process of pulp manufacture in a pulp mill in which an aqueous evaporation condensate pulp mill effluent stream, which aqueous evaporation condensate contains methanol and off gas contaminants selected from the group consisting of sulphur dioxide and total reduced sulphur (TRS) compounds is formed, the improvement wherein off gas contaminants are removed from the aqueous evaporation condensate by the method of claim 1, and an aqueous methanol stream rich in the methanol of said condensate is recovered for use.

9. The process according to claim 8, wherein said aqueous methanol stream is recycled in the pulp mill for generation of chlorine dioxide.

10. The process according to claim 8, wherein said pulp mill is a kraft pulp mill and said off gas contaminants are total reduced sulphur (TRS) compounds selected from the group consisting of hydrogen sulphide, methyl mercaptan, methyl disulphide and dimethyl disulphide.

11. The process according to claim 8, wherein said aqueous evaporation condensate is steam stripper off gas condensate.

* * * * *